(12) United States Patent
Goudou et al.

(10) Patent No.: US 10,115,008 B2
(45) Date of Patent: Oct. 30, 2018

(54) METHOD FOR DETECTING PEOPLE AND/OR OBJECTS IN A SPACE

(71) Applicant: Thales, Neuilly-sur-Seine (FR)

(72) Inventors: Jean-François Guillaume Goudou, Velizy Villacoublay (FR); Simona Maggio, Velizy Villacoublay (FR)

(73) Assignee: THALES, Neuilly sur Seine (FR)

( * ) Notice: Subject to any disclaimer, the term of this patent is extended or adjusted under 35 U.S.C. 154(b) by 187 days.

(21) Appl. No.: 15/106,153

(22) PCT Filed: Dec. 19, 2014

(86) PCT No.: PCT/EP2014/078919
§ 371 (c)(1),
(2) Date: Oct. 27, 2016

(87) PCT Pub. No.: WO2015/092049
PCT Pub. Date: Jun. 25, 2015

(65) Prior Publication Data
US 2017/0053160 A1 Feb. 23, 2017

(30) Foreign Application Priority Data

Dec. 20, 2013 (FR) .................................... 13 03046

(51) Int. Cl.
*G06K 9/00* (2006.01)
*G06T 7/00* (2017.01)
*H04N 5/225* (2006.01)
(52) U.S. Cl.
CPC ..... *G06K 9/00362* (2013.01); *G06K 9/00201* (2013.01); *G06K 9/00771* (2013.01); *G06T 7/0051* (2013.01); *G06T 2207/10004* (2013.01); *G06T 2207/30196* (2013.01)

(58) Field of Classification Search
CPC .................................... G06K 9/00; G06T 7/00
USPC .................................. 382/103; 348/169–172
See application file for complete search history.

(56) References Cited

U.S. PATENT DOCUMENTS

| 7,123,745 | B1 | 10/2006 | Lee | |
|---|---|---|---|---|
| 8,452,051 | B1* | 5/2013 | Lee | G06F 3/011 |
| | | | | 382/103 |
| 8,542,910 | B2* | 9/2013 | Leyvand | G06K 9/469 |
| | | | | 382/154 |

FOREIGN PATENT DOCUMENTS

| DE | 102008002275 A1 | 12/2009 |
|---|---|---|
| EP | 1482448 A2 | 1/2004 |

OTHER PUBLICATIONS

Search Report dated Oct. 9, 2014 for French Application No. 1303046.
Beymer et al., "Real-Time Tracking of Multiple People Using Continuous Detection", Frame-Rate Workshop, Sep. 21, 1999.
Park et al., "Head Segmentation and Head Orientation in 3D space for Post Estimation of Multiple People", Apr. 2, 2000, pp. 192-196.

\* cited by examiner

*Primary Examiner* — Abolfazl Tabatabai
(74) *Attorney, Agent, or Firm* — Thompson Coburn LLP; Steven M. Ritchey

(57) ABSTRACT

The invention relates to a method for detecting persons and/or objects in a space using a depth map to be analyzed, comprising a step for detecting the head and shoulders of any people who may be present in the depth map to be analyzed.

12 Claims, 7 Drawing Sheets

METHOD FOR DETECTING PEOPLE AND/OR OBJECTS IN A SPACE

CROSS-REFERENCE TO RELATED APPLICATIONS

This application is a U.S. National Phase application of PCT/EP2014/078919, filed on Dec. 19, 2014, claiming the benefit of FR Application No. 13 03046, filed Dec. 20, 2013, both of which are incorporated herein by reference in their entireties.

The present invention relates to a method for detecting people and/or objects in a space, an associated computer program and an access control system using such a detection method.

Access control systems are commonly used in the field of transportation for people. As an example, access control systems are used in public transit by land and air. Thus, such systems are found in train stations, subway stations and air terminals.

These access control systems comprise a corridor to which access is regulated by opening or closing a door. The passage, or at least presence, of a person must then be suitably detected in the corridor portion preceding door. The opening of the door is then synchronized with the passage of the detected person. Furthermore, the opening duration of the door is adapted and limited to allow the passage of the detected person without allowing the passage of the following person, whose access right has not been checked and validated. Indeed, it is desirable to allow only people bearing a valid transportation title to pass the physical access control system, so as to prevent fraud.

To that end, access control systems are known whereof the corridor is laterally defined at each side by a box. One of the boxes includes cells for transmitting light beams and the other comprises cells for receiving light beams placed across from a corresponding transmission cell. Thus, the detection of persons is done by breaking one or more light beams.

Economic reasons lead to the limitation of the number of cells. This results in accidents, in particular caused by abrupt and untimely closing of the door on a person. For example, in the case of an adult person accompanied by a young, small child, the door risks closing before the child has passed, if the child is following the adult. Similarly, if a person is carrying a large backpack or a wheeled suitcase, or pushing a stroller, which is relatively common in the case of access to transportation networks, there is a risk of untimely closing of the door on the backpack, wheeled suitcase or stroller.

To prevent such accidents, the opening time of the door is simply increased.

However, this is not fully satisfactory. Indeed, on the one hand, the risk of fraud is increased, since the possibility remains for unauthorized people to pass. On the other hand, the number of people able to cross a corridor per unit of time is reduced, which may affect the "fluidity" of the passage, unless the number of parallel corridors is increased.

Thus, to ensure good safety, the largest possible number of cells should be arranged in the boxes of the access control systems.

However, in some situations, due to the separation of the cells, specific cases of fraud such as two people following one another very closely or located at the same level are not detected. This type of fraud is called "tailgating".

There is therefore a need for a more effective method for detecting persons and/or objects in a space.

According to the invention, this aim is achieved by a method for detecting persons and/or objects in a space comprising a floor using a depth map to be analyzed, a vertical direction being defined as the normal to the floor, the depth map representing the distance along the vertical direction, acquired by an optical sensor, comprising a step for detecting the head and shoulders of any people who may be present in the depth map to be analyzed.

According to specific embodiments, the method comprises one or more of the following features, considered alone or according to any technically possible combinations:
- the space is a corridor, the corridor comprising a passage, the passage extending primarily along a first transverse direction, a door extending along a second transverse direction, the second transverse direction being perpendicular to the first transverse direction, the vertical direction being perpendicular to the two transverse directions, an optical sensor being positioned over the corridor.
- the method further includes the steps of providing an image of the space, providing a conversion and reconstruction law of the depth map from the supplied image and the supplied conversion law.
- the method further includes the steps of providing at least one image of part of the space, each image having a spatial overlap with at least one other image, and reconstruction of the depth map from the supplied images.
- the method includes a step for providing a depth map to be processed by an optical sensor having acquired the map and a step for processing the depth map to obtain the map to be analyzed.
- the depth map to be analyzed includes pixels each associated with a respective distance from the optical sensor, the method further including a step for determining at least one zone grouping together the pixels associated with the same distance to within plus or minus 5%.
- the method also includes a step for selecting two zones from among the predetermined zones, the selected zones being the predetermined zones associated with the two smallest distances relative to the optical sensor.
- the detection step includes an ellipse fitting at the selected zones.
- the detection step also includes computing a similarity score with a human model based on the ellipses obtained after fitting.
- the score is decreased if the difference between the distances respectively associated with the two selected zones is below 25 centimeters (cm) in absolute value.
- the fitting includes modifying the orientation and position of each ellipse to increase a correlation coefficient between the selected zones and the ellipse to be fitted.

Furthermore, a computer program product is proposed including programming code instructions able to be implemented by a processor, the processor being able to carry out the method as previously described.

Also proposed is an access control system including a corridor extending along a first direction and barred by a door opening or closing to allow or prohibit the passage of persons, based on the detection of the presence of persons and/or verification of the access authorization assigned to those persons. The access control system comprises means for recognizing access locations to the corridor, an optical sensor able to acquire a depth map of at least part of the access control system and positioned over the corridor, and a controller able to recognize and monitor the outline of persons and/or objects present in the corridor, for an appropriate opening and closing command of the door, the controller being able to carry out the method as previously described.

According to the invention, this aim is achieved by a method for detecting persons and/or objects in a space using a depth map to be analyzed, comprising a step for detecting the head and shoulders of any people who may be present in the depth map to be analyzed.

According to specific embodiments, the method comprises one or more of the following features, considered alone or according to any technically possible combinations:
the method includes a step for providing a depth map to be processed by an optical sensor having acquired the map and a step for processing the depth map to obtain the map to be analyzed.
the depth map to be analyzed includes pixels each associated with a respective distance from the optical sensor, the method further including a step for determining at least one zone grouping together the pixels associated with the same distance to within plus or minus 5%.
the method also includes a step for selecting two zones from among the predetermined zones, the selected zones being the predetermined zones associated with the two smallest distances relative to the optical sensor.
the detection step includes an ellipse fitting at the selected zones.
the detection step also includes computing a similarity score with a human model based on the ellipses obtained after fitting.
the score is decreased if the difference between the distances respectively associated with the two selected zones is below 25 centimeters (cm) in absolute value.
the fitting includes modifying the orientation and position of each ellipse to increase a correlation coefficient between the selected zones and the ellipse to be fitted.

Furthermore, a computer program is proposed including programming code instructions able to be implemented by a processor, the processor being able to carry out the method as previously described.

Also proposed is an access control system including a corridor extending along a first direction and barred by a door opening or closing to allow or prohibit the passage of persons, based on the detection of the presence of persons and/or verification of the access authorization assigned to those persons. The access control system comprises means for recognizing access locations to the corridor, an optical sensor able to acquire a depth map of at least part of the access control system and positioned over the corridor, and a controller able to recognize and monitor the outline of persons and/or objects present in the corridor, for an appropriate opening and closing command of the door, the controller being able to carry out the method as previously described.

Other features and advantages of the invention will appear upon reading the following description of embodiments of the invention, provided as an example only and in reference to the drawings, which are:

FIG. 1, an overall perspective view of one example access control system,
FIG. 2, a planar top view of the access control system of FIG. 1,
FIG. 3, a flowchart of one example detection method,
FIG. 4, one example background depth map,
FIG. 5, an example background depth map showing a person with a stroller,
FIG. 6, one example mask obtained with a first sensitivity threshold,
FIG. 7, an example mask obtained with a second sensitivity threshold,
FIG. 8, one example depth map corresponding to the passage of a person,
FIG. 9, an illustration of the volume occupied by the person shown in FIG. 8,
FIG. 10, a diagrammatic illustration of the person of FIG. 8 after the sub-step for determining regions of interest,
FIG. 11, a diagrammatic illustration of the sub-step for comparison with a theoretical zone forming the head of the person of FIG. 8, and
FIG. 12, a diagrammatic illustration of the sub-step for comparison with a theoretical zone forming the head and shoulders of the person of FIG. 8.

An access control system 10 is shown in FIG. 1.

The access control system 10 is a physical access control system.

The access control system 10 is of the bidirectional type. In the case of a "bidirectional" access control system, as considered in the example illustrated in FIG. 1, this may be an alternating bidirectional access control system, i.e., which, during a given period, only authorizes passage in one of two directions, chosen appropriately, or a permanent bidirectional access control system, i.e., which allows passage in both directions at any time.

According to the example of FIG. 1, the authorized circulation direction is indicated by an arrow 12. As a result, a left side and a right side may be defined. The left side corresponds to the left side of a passenger circulating in the circulation direction, while the right side corresponds to the right side of the same passenger circulating in the circulation direction.

The access control system 10 includes a corridor 14, a door 16, an optical sensor 18 and a controller 20.

The corridor 14 comprises a passage 22, a first box 24, a second box 26 and two recognition means 28 for an access right.

The passage 22 extends primarily along a first direction X.

The first box 24 is located on the left side of the passage 22, while the second box is located on the right of the passage 22.

According to the example of FIG. 1, the second box 26 includes the first recognition means 28. The first recognition means 28 is positioned at one end of the second box 26, this end being the distal end relative to the door 16.

Furthermore, in the direction opposite the circulation direction, the first box 24 includes the second recognition means 28, the second recognition means 28 being positioned at one end of the first box 24, this end being the distal end relative to the door 16.

In the illustrated example, each recognition means 28 is a reader.

The recognition means 28 is able to allow a person to pass through the corridor 14 when the transportation title, a magnetic card granting an access right, is presented to the reader 28. To impart an access right, the transportation title or the magnetic card must be recognized as valid by the recognition means 28.

Alternatively, the second box 26 includes a remote reader able to remotely read the identification means of said person in place of the reader 28.

The door 16 is able to open or close to allow or prohibit the passage of persons, based on the detection of the presence of persons and/or verification of the access authorization assigned to those persons.

The door 16 extends along a second direction Y perpendicular to the first direction X and is arranged midway down the corridor 14. This means that the door 16 is at an equal distance along the first direction X from each end of the boxes 24, 26 defining the corridor 14.

The door 16 includes two leaves 30 and 32: a left leaf 30 and a right leaf 32.

For example, the two leaves 30 and 32 are made from glass in order to obtain mechanically strong leaves.

The two leaves 30 and 32 are movable in a same vertical plane transverse to the corridor 14 between a so-called open position and a so-called closed position. The passage from the open position to the closed position is done by sliding. This sliding is indicated by two arrows 34 on the line 1.

The two arrows 34 are along the second direction Y.

The open position is shown in FIG. 1. In the open position, the two leaves 30, 32 are respectively retracted in the first box 24 and the second box 26, which frees the passage through the corridor 14.

The closed position of the leaves 30 and 32 is shown in FIG. 2. In the closed position, the two leaves 30 and 32 are respectively close to one another so as to bar the passage through the corridor 14.

To obtain this particular operation, according to the example of FIG. 1, each box 24, 26 includes a member controlling the movements of the respective leaves 30, 32. The control members are not shown in FIGS. 1 and 2, for simplification reasons. The control members are able to control the opening and closing of the leaf 30, 32 with which those members are associated. The control member of the first box 24 is thus able to control the movements of the left leaf 30, while the control member of the second box 26 is able to control the movements of the right leaf 32. For example, the control members are motors.

Alternatively, the two leaves 30 and 32 are movable between an open position and a closed position by rotating the leaves 30 and 32 around their own axes. In this case, the two leaves 30 and 32 are pivoting.

According to other embodiments, the door 16 includes a single leaf or is a gate.

The optical sensor 18 is able to acquire one or more images of the access control system 10. More specifically, the sensor 18 is able to acquire images of at least the passage 22 of the corridor 14.

To that end, according to the example of FIG. 1, the optical sensor 18 is positioned over the corridor 14. In the specific case of FIG. 1, this means that the optical sensor 18 is substantially, along a third direction Z, perpendicular to the directions X and Y. Thus, the optical sensor 18 is at the passage 22 of the corridor 14, i.e., it is situated at the vertical of the passage 22. Furthermore, since the optical sensor 18 is able to acquire images of at least the passage 22 of the corridor 14, this means that the distance of the optical sensor 18 along the third direction Z relative to the floor defining the corridor 14 is relatively large, typically greater than 300 cm, and preferably greater than 250 cm.

In the illustrated example, the optical sensor 18 is a camera working on the time of flight (TOF) principle. Such a camera makes it possible to acquire three-dimensional maps or depth maps of the corridor 14. By definition, a depth map or three-dimensional map is a two-dimensional matrix providing the distance of the elements seen by the sensor 18 relative to the optical sensor 18 instead of providing the number of photons coming from the elements seen by the optical sensor 18.

In the illustrated example, the optical sensor 18 comprises a matricial detector 36 and an optical system 38.

The matricial detector 36 is for example a detector of the CCD type. A CCD (Charge Coupled Device) detector is a detector able to convert a light signal into an electrical signal.

As an illustration, the optical system 38 comprises lenses.

Alternatively, the optical system 38 includes prisms and/or waveguides.

According to another embodiment, the optical sensor 18 includes only a matricial detector 36.

The controller 20 is able to recognize and monitor the outline of persons and/or objects present in the corridor 14 from depth maps acquired by the optical sensor 18, for an appropriate opening/closing command of the door 16.

In particular, the controller 20 is able to recognize the outlines of persons engaged in the corridor 14, including the potential presence of a backpack, or a large object pulled by the person, or a small child accompanying the person.

The controller 20 is also able to make an opening or closing decision based on the outlines recognized and/or monitored.

The controller 20 includes an electric processing unit able to analyze and process the depth maps from the sensor 18. In particular, the electronic processing unit is able to carry out a method for detecting persons and/or objects in a space.

According to FIG. 1, the controller 20 is situated in the second box 26 and cooperates with the optical sensor 18, the access right recognition means 28 and the members controlling the movements of each leaf 30 and 32. This cooperation is for example implemented by optical signal communication.

The operation of the access control system 10 will now be described.

A person introduces a transportation title recognized as valid, and authorizing the passage of that person, in the reader 28.

In parallel, the sensor 18 acquires depth maps that show the person passing through the passage 22.

The controller 20 is then able to detect one or more persons and/or objects in the depth maps acquired by the optical sensor 18.

To that end, the controller 20, or more specifically the electronic processing unit, carries out a method for detecting persons and/or objects in the corridor 14 as illustrated by the flowchart of FIG. 3.

The detection method includes a step 100 for providing a depth map of the corridor 14 and any persons and/or objects located in the corridor 14. The depth map comes from the optical sensor 18. For example, the optical sensor 18 sends the data corresponding to the acquired depth map to the controller 20 via optical signals.

The detection method then comprises a step 102 for processing the depth map provided in the supply step 100.

The processing step 102 seeks to improve the quality of the supplied depth map. In particular, it is desirable to reduce the acquisition noise coming from the moment where the optical sensor 18 has acquired the depth maps to increase the signal/noise ratio.

Preferably, the processing step 102 is carried out using an image noise suppression algorithm.

For example, in the processing step 102, smoothing of the depth map by a Gaussian core is done. In the case at hand, the Gaussian core can be characterized relative to a pixel of the depth map, the Gaussian core measuring 3×3 pixels with a width of 0.5 pixels.

Alternatively, other types of smoothing or processing may be considered.

At the end of the processing step 102, a processed depth map is therefore obtained.

The detection method next comprises a step 104 for extracting the background of the processed depth map.

The extraction step 104 of the detection method comprises four sub-steps 104_1, 104_2, 104_3 and 104_4, which will now be outlined.

The detection method first includes a first sub-step 104_1 for supplying a depth map of the corridor 14 without any persons and/or objects in the corridor 14. In the rest of the description, such a depth map is referred to as a "background depth map" or "background image".

Preferably, the background image corresponds to a depth map of the corridor 14 without persons or objects having undergone the same quality improvement processing as that proposed in the processing step 102. In particular, according to the example of the method of the flowchart of FIG. 3, smoothing of the background image is done with a Gaussian core.

The method includes a second sub-step 104_2 for choosing a first desired detection height. The first desired detection height is denoted H1 in the rest of the description.

Depending on the case, the choice is automatic or made by a user of the method.

The method next includes a third sub-step 104_3 for generating a first depth map from the background image and the first detection height H1.

To that end, the controller 20 converts the first detection height H1 into a first so-called scale factor or sensitivity factor parameter P1. This first parameter P1 is comprised between 0 and 1.

The controller next obtains the first depth map image by multiplying the background image by the first parameter S1. In this context, to define the multiplication of a depth map by a scalar, it should be recalled that a depth map corresponds to the value of the distance relative to the optical sensor 18 for a plurality of pixels. Thus, multiplying a depth map by a scalar means that the distance value of each pixel is multiplied by the scalar.

The method next includes a fourth sub-step 104_4 for subtracting the first background image from the processed depth map to obtain a first depth map to be analyzed.

It can be shown that by subtracting the first background image, a depth map limited to a certain height relative to the optical sensor 18 is obtained. Thus, the first depth map to be analyzed makes it possible to detect all of the people and objects comprised between the optical sensor 18 and the first height H1 relative to the floor defining the corridor 14.

FIG. 4 shows an example background depth map.

Figure 5:
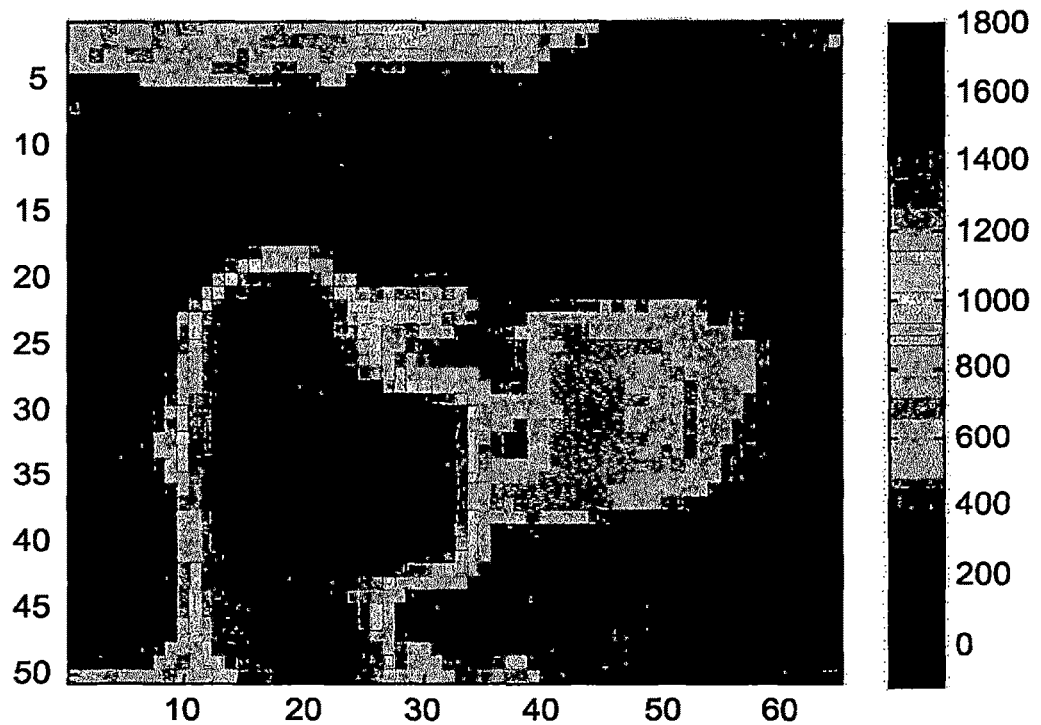

The depth map shown in FIG. 5 corresponds to a processed depth map obtained in the presence of a person with a stroller. A first parameter P1 of 0.75 is chosen. The first associated background image is not shown. By subtracting this first background image from the depth map of FIG. 5, a first depth map to be analyzed is obtained.

Figure 6:
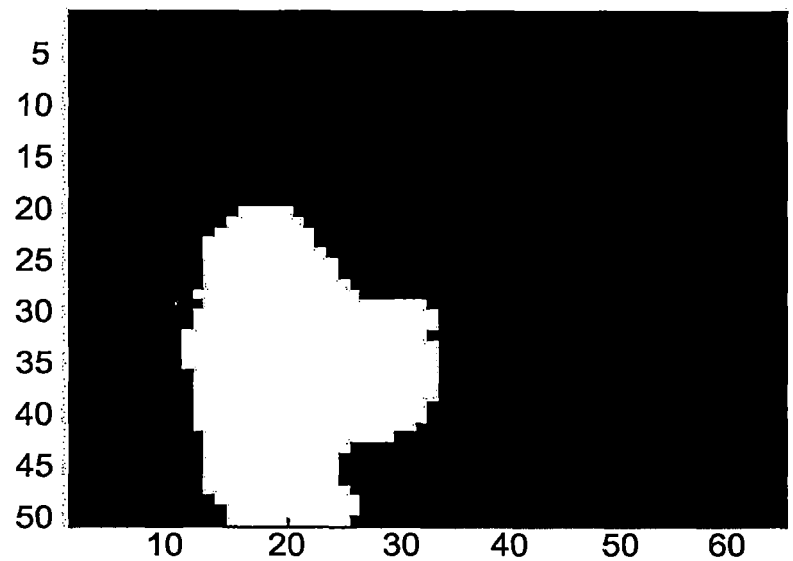

The associated depth mask is shown in FIG. 6.

By definition, a depth mask is a binary illustration of a depth map. A zero (white) value indicates that an object or person exceeds the detection height, while a value of 1 (black) indicates the absence of an object or person exceeding the detection height.

Figure 7:
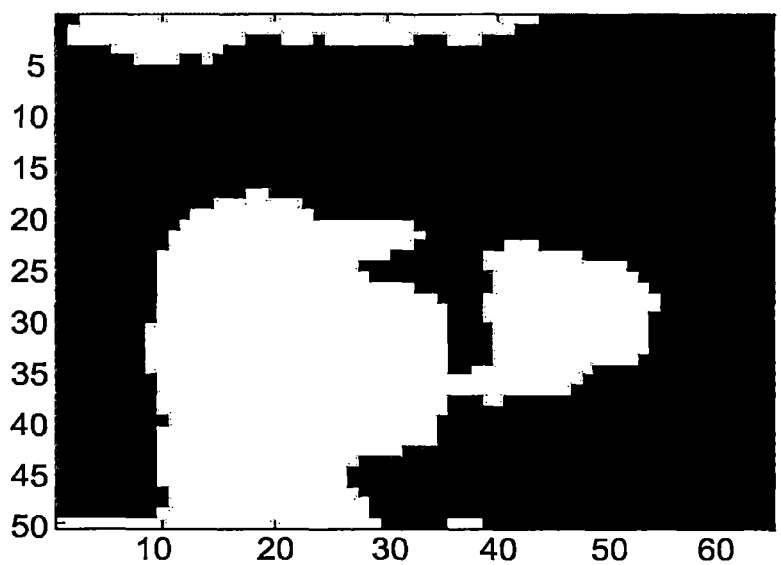

If the first parameter P1 is increased to 0.9, the mask of FIG. 7 is obtained.

The detection height decreases when the first parameter P1 increases. As a result, for a height corresponding to a first parameter of 0.75, only the head and shoulders of the person pushing the stroller are observed, while for a first parameter equal to 0.9, both the body of the adult person pushing the stroller and a shape corresponding to the stroller itself are observed at the same time.

In other words, in the illustrated cases, for a first parameter of 0.75, it is possible to detect objects with a size greater than about 1 m (as a result of which the stroller is not observed), and for a sensitivity of 0.9, practically all objects with a size larger than the ground are detected.

The detection method then includes a step 106 for extracting relevant related components of the depth mask.

An algorithm for calculating related components applied directly to the depth mask makes it possible to extract the related components of the depth mask. These related components are not, however, the relevant related components inasmuch as the depth mask includes imperfections related to the acquisition of the depth map and fluctuations during that acquisition.

Figure 1:
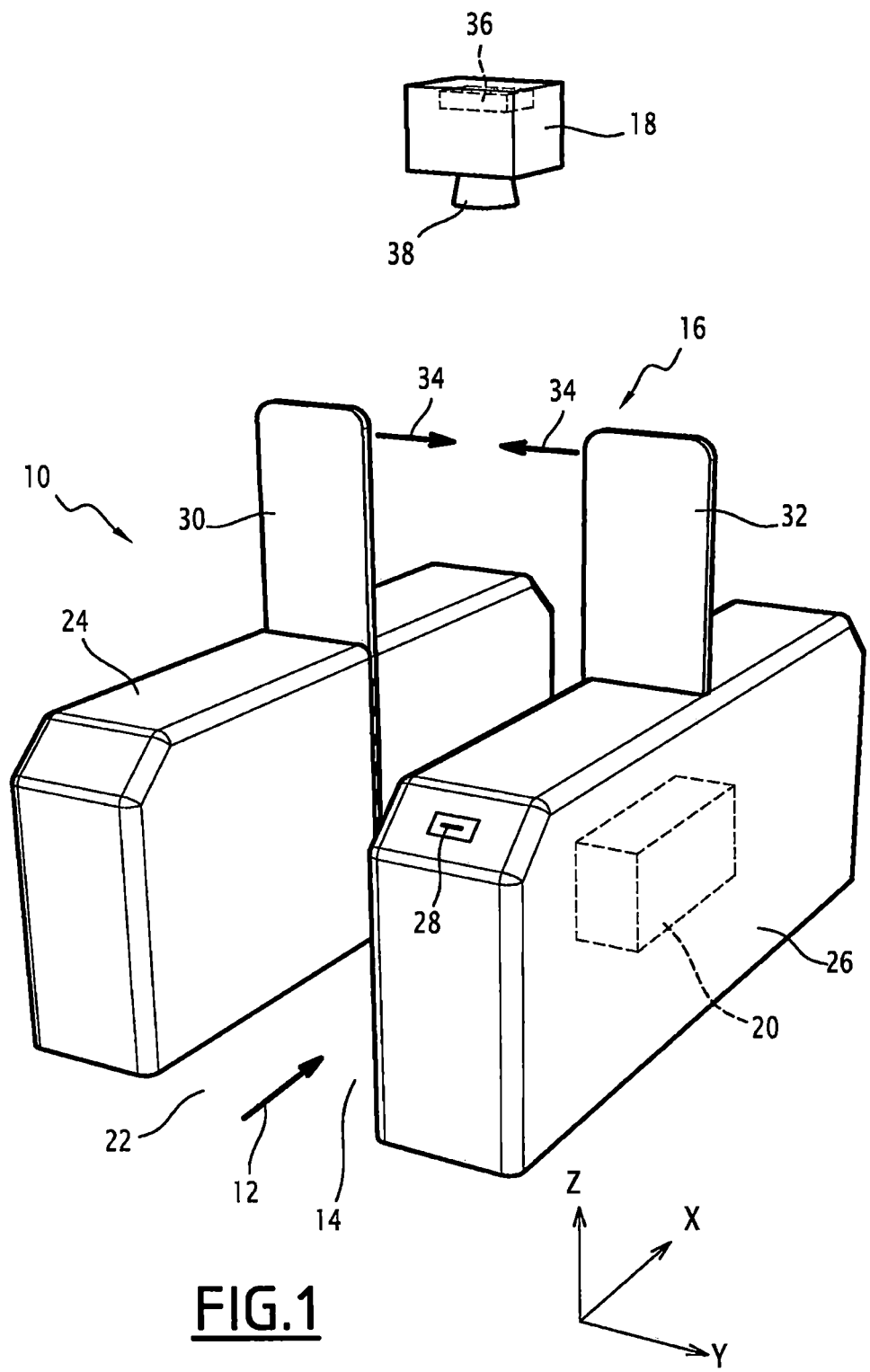
Figure 2:
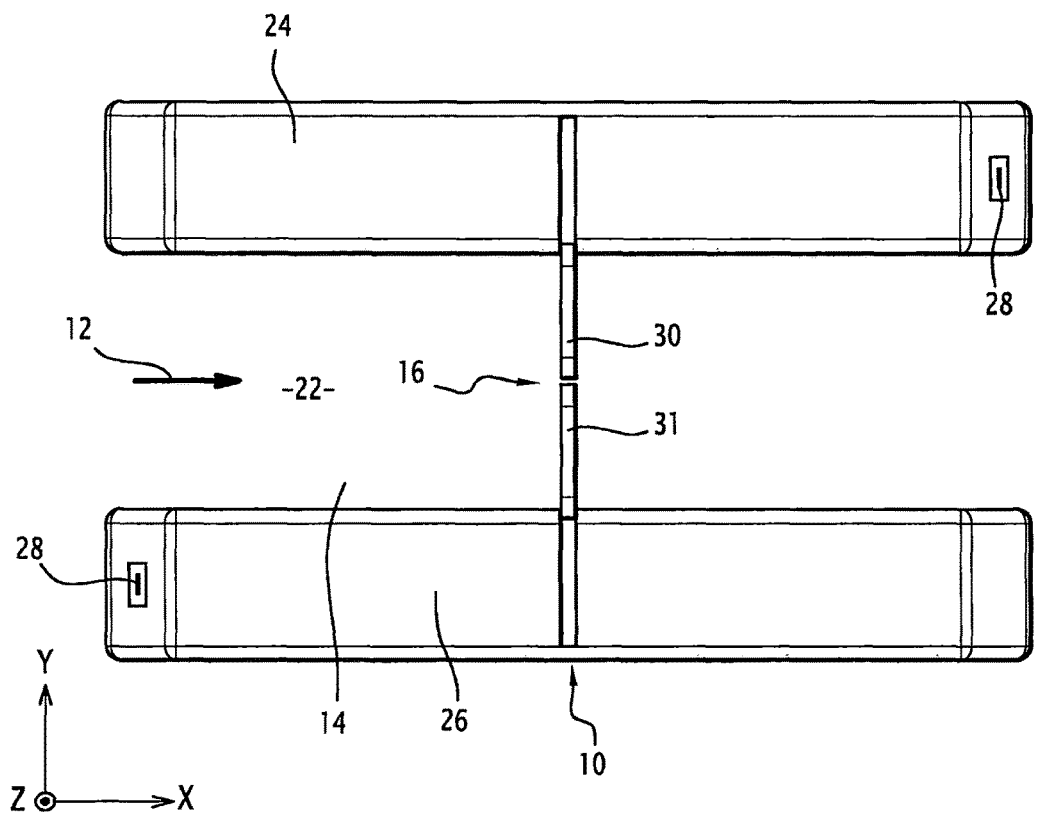
Figure 3:
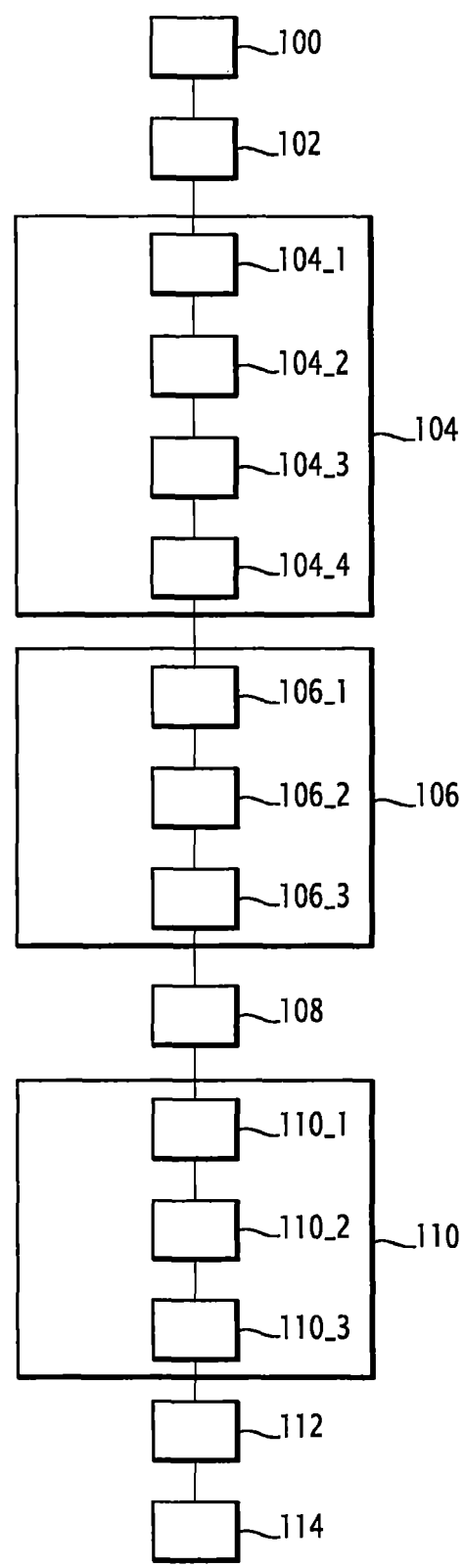
Figure 4:
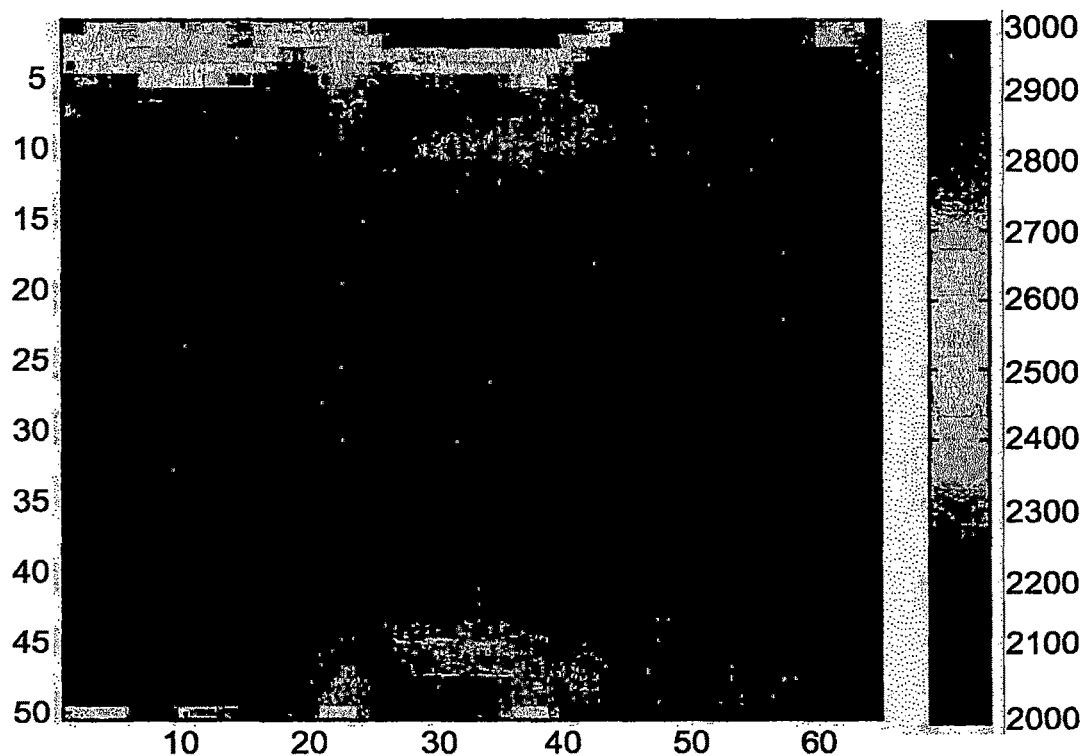
FIGS. 4 to 7 illustrate step 104 for extracting the background of the processed depth map.

As a result, according to the example of FIG. 2, the step 106 for extraction of the relevant related components comprises two sub-steps 106_1 and 106_2: a first sub-step 106_1 for regularizing the depth mask and a second sub-step 106_2 for calculating the related components of the regularized depth mask.

The regularization sub-step 106_1 is done using morphological operations aiming to eliminate the small regions of the mask. These regions would not be relevant in the context of the targeted application, i.e., recognizing macroscopic objects and persons. Depending on the cases, these are several isolated white pixels that are blackened or black pixels that are made white. This change is based on the environment of the pixel and the morphology of the expected zones in the presence of persons or typical objects.

Alternatively, the regularization sub-step 106_1 comprises smoothing processing operations.

The related components analysis of the calculating sub-step 106_2 then makes it possible to extract the relevant related components of the regularized mask.

It is therefore understood that the term "relevant", in the context of this step 106 for extraction of the related components, means relevant with respect to the detected objects or persons.

Figure 8:
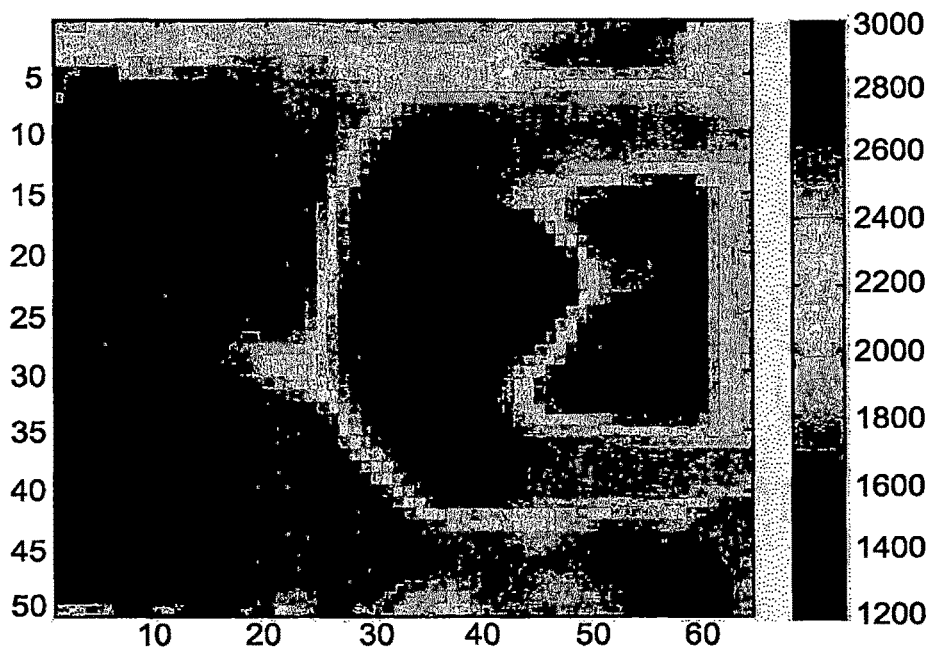
Figure 9:
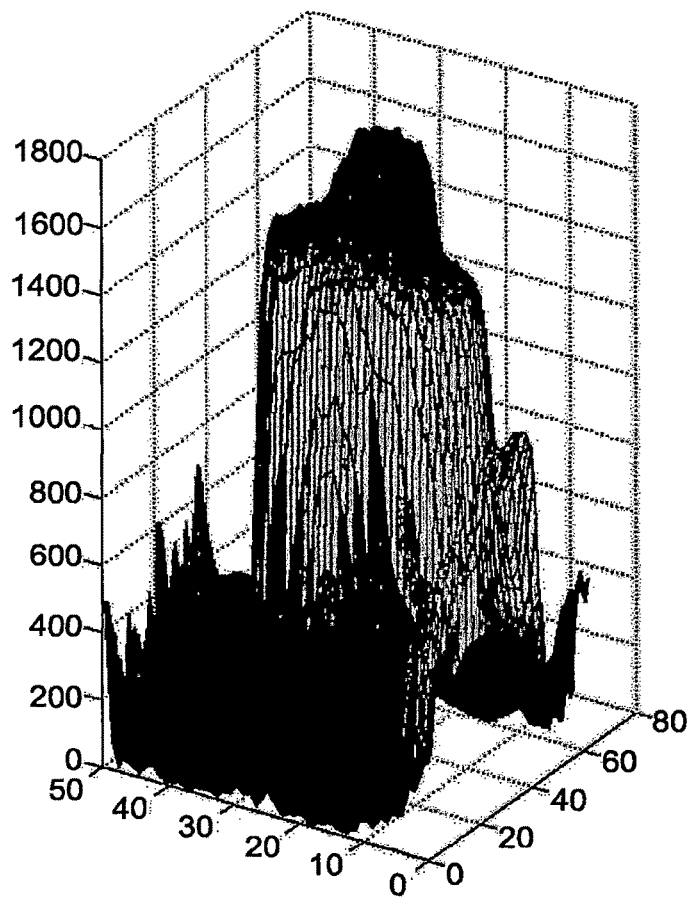

At the end of the step 106 for extraction of the relevant related components, a certain number of related components are therefore obtained. Each of these related components will be examined successively. In the rest of the description, only the processing applied on a single related component is described, knowing that in general, the same processing is applied to all of the related components in turn. To that end, the method will be illustrated using one particular situation where only one person is present, as shown in FIG. 8.

The determination method next includes a step 108 for determining the number of objects and/or persons contained in the studied related component.

This determination step 108 uses the surface in number of pixels of the related component, as well as its morphology.

As an illustration for the described case, it is estimated that in a single related component, one, two or three elements (objects or persons) are present in the following cases:
- if the area of the related component is smaller than a first surface threshold value S1: there is no element in the related component,
- if the area of the related component is comprised between the first surface threshold value S1 and the second surface threshold value S2, an element is present in the related component, if the area of the related component is larger than the second surface threshold value S2 and lower than a third surface threshold value S3, and the circularity of the related component is above a circularity threshold C1, an element is present in the related component, if the area of the related component is comprised between the second surface threshold value S2 and the third surface threshold value S3, and if the circularity of the related component is below the circularity threshold C1, two elements are present in the related component, and if the surface area of the related component is larger than the third surface threshold value S3, there are three elements in the related component.

The circularity, denoted C, is a parameter defined by the following formula:

$$C = \frac{4\pi A}{P^2}$$

Where:
A is the area of the related component, and
P is the perimeter of the related component.

The threshold values S1, S2, S3 and S4 depend on a model head of an average person. The model also depends on the acquisition parameters of the depth map and/or processing parameters applied to the depth map.

The acquisition parameters of the depth map may in particular comprise the desired detection height (H1 in the case at hand), the height of the camera, the acquisition frequency of the camera, the field of the camera.

The processing parameters applied to the depth map for example comprise the parameters of the noise suppression core applied to the depth map, the first parameter P1 or the characteristic parameters of any morphological filters applied to extract the relevant related components.

According to the embodiments, the processing parameters are obtained empirically by using the experience of one skilled in the art or by a learning algorithm on persons or on persons carrying objects or on persons pushing or pulling objects. The learning algorithm makes it possible to establish an overall optimization of the choice of parameters by considering several parameters at the same time, unlike the empirical method, which consists of the positioning oneself at a local optimum for certain parameters to obtain the best choice.

This method for estimating the number of objects is therefore a method with evolving thresholds, which makes it possible to improve the precision of the detection of the number of persons and/or objects in certain specific cases, such as when two children pass in the corridor 14. With a model simply using the depiction of the head of an average person, only one person is detected, whereas with the proposed method, two people are detected.

Alternatively, the estimating method includes only a step for comparing the area of the related component without a comparison for the circularity. This is simpler to implement.

In the illustrated case, at the end of the estimating step 108, it is determined that the space in question, i.e., the studied related component, only comprises one object or one person.

The detection method then includes a step 110 for detecting persons and/or objects in the studied related component.

The detection step 110 includes a plurality of sub-steps 110_1, 110_2 and 110_3 that will now be described.

The detection step 110 includes a sub-step 110_1 for determining regions of interest.

In the context of the invention, it is recalled that the map includes a set of pixels each associated with a distance from the optical sensor 18. A region of interest groups together the pixels associated with a same distance to within ±5%. Each region of interest may therefore be defined by a distance from the optical sensor 18.

According to one preferred embodiment, the determined regions of interest only group together the adjacent pixels. Indeed, in the case of a detection of a human being, the regions of interest correspond to parts of the body and are therefore continuous.

Multiple known algorithms make it possible to obtain the regions of interest. As an example, a region of interest may be obtained using a clustering algorithm. In statistical data analysis, data clustering describes methods for classifying data such as the hierarchical grouping method or the data partitioning method. In the case at hand, the data to be classified are the distances from the optical sensor 18.

Figure 10:
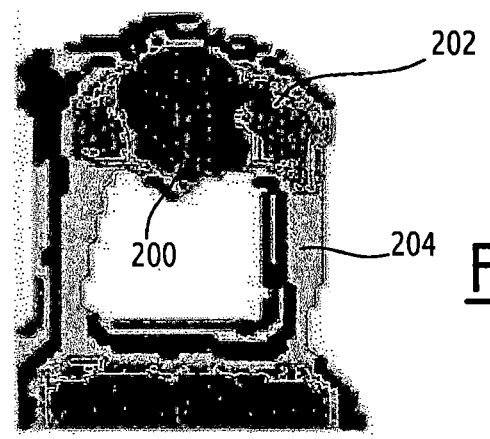

As an illustration, for the case of a person traversing the corridor (case of FIG. 8), several regions of interest have been determined, as shown in FIG. 10. Three regions of interest in particular appear: a first region of interest 200 associated with the person's head, a second region of interest 201 associated with the person's shoulders, and a third region of interest 204 associated with the person's arms.

Optionally, the detection step 110 includes an additional step for selecting regions of interest. One manner of selecting the regions of interest is to choose the distances with which they are associated. For example, for the described method, the two regions of interest for which the distance from the optical sensor 18 is smallest are particularly interesting inasmuch as the likelihood of these regions of interest corresponding to the head and shoulders is high.

The detection step 110 further includes a sub-step 110_2 for fitting theoretical zones from a human model of the head and shoulders to the first two regions of interest 200 and 202.

The region of interest 200 corresponding to the head and the region of interest 202 corresponding to the shoulders are respectively compared to two theoretical zones. In the case at hand, the theoretical zone of the head is a first ellipse, while two ellipses correspond to the theoretical zone of the shoulders. In each of these cases, the theoretical zones are fitted according to a selected metric so that the theoretical zones correspond, from the point of view of their orientation and position, to the selected regions of interest.

Figure 11:
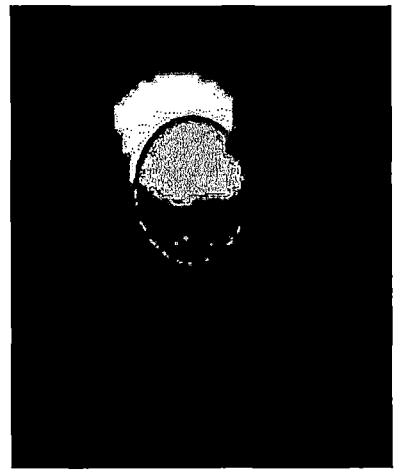
Figure 12:

In the example illustrated by FIG. 11, the best orientation of the theoretical zone is chosen as that which provides the best correlation.

The same procedure is repeated for the shoulders.

The detection step 110 [includes] a sub-step for calculating a similarity score between the human model and the studied related component, this score being compared to a threshold. When the score is above the threshold, a human being is detected.

Using these fitted theoretical zones, it is possible to obtain a similarity score between the fitted theoretical zone and the studied region of interest. For the head, the similarity score is calculated using the following formula:

$$S_{t\hat{e}te} = 1 - \frac{M_{t\hat{e}te} - D_{t\hat{e}te}}{M_{t\hat{e}te} + D_{t\hat{e}te} - M_{t\hat{e}te} \cap D_{t\hat{e}te}}$$

Where:

$S_{tête}$ is the similarity score for the head, $M_{tête}$ is the area associated with the theoretical zone for the head, $D_{tête}$ is the area associated with the region of interest 200 corresponding to the head, and $M_{tête} \cap D_{tête}$ is the area associated with the intersection of the theoretical zone for the head and the region of interest 200 corresponding to the head.

The similarity score for the shoulders is calculated in the same way.

To obtain a global similarity score with a human model, a mathematical average of the two similarity scores is taken. This is written mathematically as:

$$S = 1/2(S_{tête} - S_{épaules})$$

Where:

S is the overall similarity score, $S_{tête}$ is the similarity score for the shoulders.

Preferably, to improve the detection, the overall score is decreased if the difference between the distance associated with the region of interest 200 corresponding to the head and the distance associated with the region of interest 202 corresponding to the shoulders is smaller than 250 mm. Indeed, according to the applicant, such a distance corresponds to the minimum distance between the head and the shoulders. As a result, if the distance between the head and the shoulders is smaller than 250 mm, this generally means that the detected and studied related component is in reality an object.

For example, the overall similarity score may be multiplied by a scalar smaller than 1, for example 0.8.

The overall similarity score is then compared to a threshold. Preferably, the threshold is determined by a learning algorithm.

In the case at hand, since a human being is present, the presence of a person is detected.

The detection method also includes a step 112 for monitoring objects and/or persons. For example, object monitoring may be done using the Munkres algorithm.

If necessary, the method may also include a step 114 for detecting the person and/or object environment surrounding the person detected at the end of the detection step 110. For example, such an environment detection step 114 consists of repeating the steps for background extraction 104, relevant related component extraction 106, estimating 108 and person and/or object detection 110 in the second related component studied at a second predetermined height H2 (and therefore a first parameter value equal to 0.9 instead of 0.75).

This makes it possible to benefit from the results of the first analysis at the first predetermined height H1 and to detect the stroller more easily. The presence of a person has already been detected, and it simply remains to determine that a stroller is next to that person.

Thus, by studying the described method, it has been shown that the controller 20 commands the opening of the door 16 when the authorized person arrives in front of the door 16.

As long as the person has not fully passed through, the controller 20 keeps the door 16 open.

Once the person has passed, the controller 20 commands the closing of the door 16.

The operating example previously described is the simplest usage scenario. Other examples are also managed by the access control system 10.

In some cases, the person is carrying a backpack or suitcase, pulling a stroller, or holding the hand of a child accompanying him or her.

In this situation, as long as the person and what the person is carrying or pulling, or the child, have not fully passed through, the controller 20 keeps the door 16 open.

Once the person has passed through, as well as what the person is carrying or pulling, or the child, the controller 20 commands the closing of the door 16.

Similarly, the access control system 10 also makes it possible to avoid fraud with two people following one another closely, or if a person tries to use the passage right granted to another person by crossing the passage 22 in the direction opposite the circulation direction.

Thus, the access control system 10 is capable of detecting and distinguishing a person wearing a backpack or person pulling a suitcase or pushing a stroller, or a person accompanied by a small child. The access control system 10 therefore has a precise detection, in particular making it possible to adapt the opening time of the door 16 to each case. This prevents all accidents or incidents due to early closing. As a result, the completely safe operation of the access control system 10 is therefore ensured, the door 16 only closing after a person has completely passed through it.

The access control system 10 is usable in all physical access control applications: public transportation networks (train stations, subway stations), air terminals, public or private buildings, performance venues, sports venues, and the like.

The detection method described in reference to FIG. 2 can be used in any application where the number of people in a volume needs to be detected.

Furthermore, it will be understood that certain steps may be carried out independently with other detection methods. In particular, the background extraction step 104 to obtain a predetermined height may be carried out with another detection method only involving detecting the head. Once the detection of the head has been done, a detection at a second height is carried out, for example as is the case here to detect a stroller.

It is also possible to estimate the number of objects and/or persons (step 108) in a related component of a depth map in other contexts. This estimate is independent of the proposed method for detecting the head and shoulders.

According to another specific embodiment, the step 100 for providing a depth map of the method for detecting persons and/or objects in a space using a depth map includes a plurality of sub-steps.

In general, the supply step 100 comprises a sub-step for supplying at least one image and a sub-step for reconstructing a depth map representative of the distance along the third direction Z, which corresponds to the vertical direction.

The reconstruction sub-step is generally carried out by the controller 20.

According to a first example, the supply step 100 further comprises a sub-step for supplying a conversion law.

A single image is supplied in the image supply sub-step. As an illustration, the image comes from a camera for which an optical axis may be defined. The optical angle is angularly offset relative to the third direction Z. The optical axis is angularly offset by an angle having a value lower than or equal to 45°, preferably lower than or equal to 30°, and preferably lower than or equal to 10°.

Such a camera is able to acquire an image of the space. In the case previously illustrated, the camera makes it possible to acquire images of the passage 22 along the direction of the optical axis of the camera.

According to one particular embodiment, the camera includes a detector and an optical focus system.

The detector is for example a CCD (Charge Coupled Device) detector. Alternatively, the detector is a CMOS detector, i.e., a detector originating from a CMOS (Complementary Metal Oxide Semiconductor) manufacturing technology.

The optical focusing system is usually an objective including a plurality of lenses. Alternatively, the optical focusing system is a single lens to limit the overall cost of the camera and limit the resolution capacity of the camera so as not to identify the imaged person when the laws of the country require it.

Even if the camera is a TOF camera, the obtained image is not a depth map representative of the distance along the direction Z. Indeed, the depth map is representative of the distance along the optical axis, and the optical axis is angularly offset relative to the third direction Z.

In the sub-step for supplying a conversion law, a conversion law is supplied making it possible to convert the image supplied in the image supply sub-step into a depth map representative of the distance along the direction Z.

Typically, the conversion is obtained by performing a prior calibration, the position of the camera used in the image supplied sub-step being known. For example, a test image, for which the depth map representative of the distance along the third direction Z is known, is acquired by the camera to determine the conversion law. If needed, several test images may be used to obtain a more robust conversion law.

In the reconstruction sub-step, the conversion law is applied to the supplied image. This makes it possible to obtain a depth map representative of the distance along the third direction Z.

Such a first example has the advantage of only using a single camera while making it possible to position it with a certain latitude relative to the position overhead.

According to a second example, in the image supply sub-step, a plurality of images are supplied.

As an illustration, two, three or four images are supplied each coming from a different camera.

Each of the images is an image of the passage 22 along different directions.

The cameras are therefore oriented such that their field of view includes at least part of the passage 22.

Furthermore, there is a spatial overlap between the different images. This means that each image comprises at least one spatial zone that is also included in at least one other image.

The spatial arrangement of the cameras is chosen so that such a spatial overlap is possible.

According to one particular embodiment, each camera is situated substantially at the same distance from the floor. The expression "substantially" refers to a distance equal to within 5%.

According to another particular embodiment, the optical axis of each camera is angularly offset relative to the third direction Z. The optical axis is angularly offset by an angle having a value lower than or equal to 45°, preferably lower than or equal to 30°, and preferably lower than or equal to 10°.

Advantageously, the offset is the same for each camera.

According to one embodiment, the position of the cameras is such that their center of gravity forms a regular polygon.

In particular, in the case where three cameras are used, an equilateral triangle is obtained.

Preferably, the different cameras are identical to facilitate the implementation of the reconstruction sub-step.

In the reconstruction sub-step, an algorithm is applied making it possible to extract a depth map from the images.

The invention claimed is:

1. A method for detecting persons and/or objects in a corridor that comprises a floor, a passage extending primarily along a first transverse direction, a door extending along a second transverse direction perpendicular to the first transverse direction, wherein a vertical direction is perpendicular to the two transverse directions, and wherein an optical sensor is positioned over the corridor, the method comprising a step for detecting the head and shoulders of people present in a depth map to be analyzed, wherein the depth map to be analyzed was acquired by the optical sensor and represents a distance along the vertical direction normal to the floor.

2. The detection method according to claim 1 further comprising the following steps:
   supplying an image of the corridor;
   supplying a conversion law; and
   reconstructing the depth map to be analyzed from the supplied image and the supplied conversion law.

3. The detection method according to claim 1 further comprising the following steps:
   providing at least one image of part of the corridor, each image having a spatial overlap with at least one other image; and
   reconstructing the depth map to be analyzed from the supplied images.

4. The detection method according to claim 1 further comprising the following steps:
   providing a depth map to be processed by the optical sensor; and
   processing the depth map to be processed to obtain the depth map to be analyzed.

5. The detection method according to claim 4, wherein the depth map to be analyzed includes pixels each associated with a respective distance from the optical sensor, and
   wherein the method further comprises determining at least one zone grouping together the pixels associated with the same distance to within plus or minus 5%.

6. The method according to claim 5 further comprising a step for selecting two zones from among predetermined zones, the selected zones being the predetermined zones associated with the two smallest distances relative to the optical sensor.

7. The detection method according to claim 6, wherein the detection step comprises an ellipse fitting at the selected zones.

8. The detection method according to claim 7, wherein the detection step further comprises computing a similarity score with a human model based on the ellipses obtained after fitting.

9. The detection method according to claim 8, wherein the score is decreased if the difference between the distances respectively associated with the two selected zones is below 25 centimeters in absolute value.

10. The detection method according to claim 7, wherein the ellipse fitting comprises modifying the orientation and position of each ellipse to increase a correlation coefficient between the selected zones and the ellipse to be fitted.

11. An access control system comprising:
    a corridor extending along a first direction and barred by a door opening or closing to allow or prohibit the passage of persons based on the detection of the presence of persons and/or verification of the access authorization assigned to those persons;

means for recognizing access locations to the corridor;

an optical sensor positioned over the corridor that is able to acquire a depth map to be analyzed of at least part of the access control system; and a controller able to recognize and monitor the outline of persons and/or objects present in the corridor for an appropriate opening / closing command of the door, the controller being able to carry out the method according to claim 1.

12. A computer program product comprising:

programming code instructions for carrying out a method for detecting persons and/or objects in a corridor, the programming code instructions being a step for detecting the head and shoulders of people present in a depth map to be analyzed, wherein the depth map to be analyzed was acquired by an optical sensor and represents a distance along a vertical direction normal to the floor;

wherein the corridor comprises a floor, a passage extending primarily along a first transverse direction, a door extending along a second transverse direction perpendicular to the first transverse direction, wherein the vertical direction is perpendicular to the two transverse directions, and wherein the optical sensor is positioned over the corridor; and wherein the computer program product is stored on an information medium.

\* \* \* \* \*